Feb. 26, 1935. O. G. HALE 1,992,423
WIPER
Filed April 2, 1934
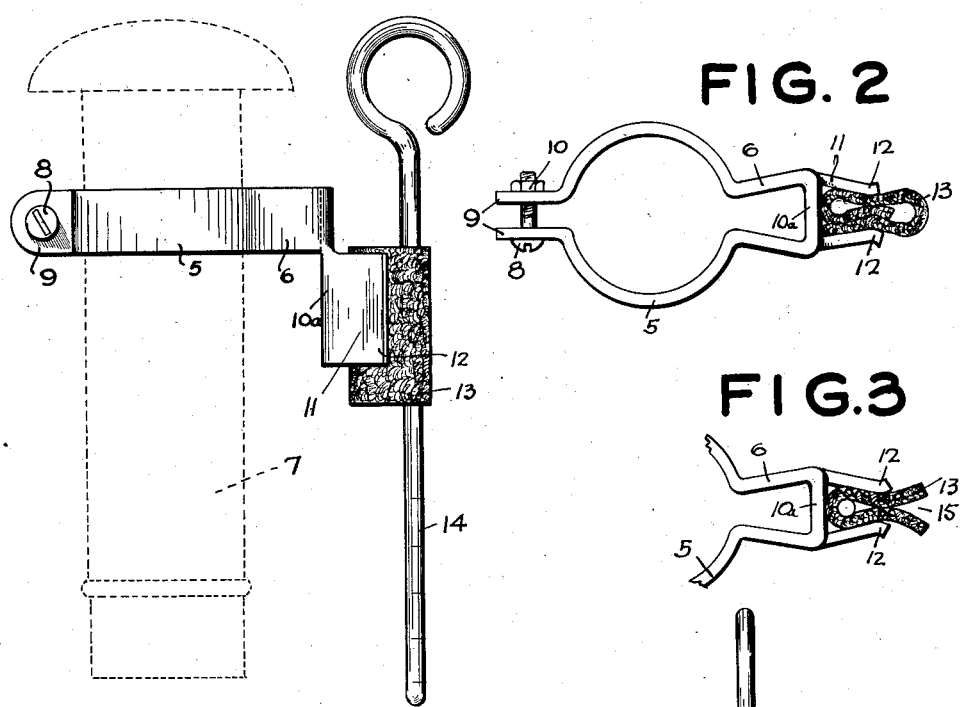
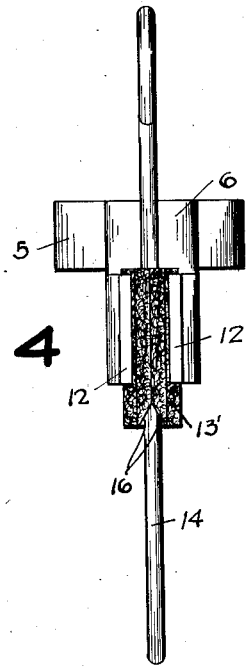
O. G. HALE
Inventor
By Herbert E. Smith
Attorney Patented Feb. 26, 1935

1,992,423

UNITED STATES PATENT OFFICE 1,992,423

WIPER

Oscar G. Hale, Condon, Oreg., assignor of one-third to Earl A. Hale, Coeur d'Alene, Idaho, and one-third to William Wehrli, Condon, Oreg.

Application April 2, 1934, Serial No. 718,660

2 Claims. (Cl. 15—210)

My present invention relates to improvements in wipers for gauge sticks, and more particularly oil gauge sticks in automotive crankcases.

An important object of my invention is to provide a wiper for gauge sticks which is readily accessible for use.

A further object of my invention is to provide a wiper for oil gauge sticks for auto crankcases that may be used as holder or carrier for the gauge stick.

Another object of my invention has been the provision of a device to embody the wiper which is readily installed upon many vehicles.

Other objects and advantages of the invention will be apparent during the course of the following description.

My invention consists of certain novel combinations and arrangements of parts as will hereinafter be more specifically referred to and claimed. In the accompanying drawing, forming a part of this specification, and in which like numerals are employed to designate like parts throughout the same;

Figure 1 is a side elevation of the device of my invention;

Figure 2 is a plan view of Figure 1 with the oil gauge stick omitted for convenience of illustration;

Figure 3 is a view similar to Figure 2 with parts omitted, but showing a modified form of wiper; and Figure 4 is a front elevation of the wiper and clamping means of my invention.

The device of my invention that I have thus far devised consists in a clamping member 5 which is formed with a resilient extension element 6, and the whole is secured around the usual breather pipe or oil filler pipe 7 of an automotive engine by means of a bolt 8 which passes through outstanding ears or lugs 9, 9, that are rigidly tightened against nut 10.

Due to minor variations in the diameter sizes of the oil filler pipes of different types of vehicular engines to which I wish to attach my wiper, I have allowed for adjustment of my clamp and the U-shaped extension 6 admirably suits my purpose. From my experience, whenever it has been necessary to adapt the device to pipes smaller than my normally shaped clamp, I have been able to squeeze the extension 6 sufficient to secure rigidity when the bolt was fully tightened. In cases where the pipe to which I wish to clamp has been larger than normal, spreading the U-shaped extension has served to give clearance.

The clamp 5 of the drawing is one form which I have used to secure rigid attachment of the wiper device to the engine or about the engine upon the vehicle in which the engine is operated, but I do not wish to be limited to this form of bracket clamp means as any suitable clamp will serve the purpose.

Preferably formed out of the same metal or secured to the bracket or clamp means is a downwardly extending member 10a which at its lower end is formed in a U-shape wiper holder 11, the outer ends 12, 12 of which are slightly closer together than at the base. The wiper holder 11 by means of the outer ends 12, 12 securely grips or clamps the wiper element 13 which may be of felt, cloth, or any other wiping material that may be found suitable for the purpose.

The wiping element 13, as shown in the drawing, is of a heavy felt, with very absorbent qualities to insure clean wiping of the oil gauge stick.

In Figures 1 and 3 I have illustrated an oil gauge stick 14 positioned in the wiping element 13 where, due to the resiliency of the wiping felt, it is securely gripped, but is will be understood that this stick when withdrawn has had any surplus oil removed in order that a clean reading may be obtained when the stick is inserted in the crankcase of an engine.

In Figure 2 it will be observed that the wiping felt 13 is folded to form loops and apertures into which the gauge stick may be inserted, and in Figure 3 I have shown a slightly modified wiping felt 13', the ends of the felt are not folded or tucked in but are allowed to flare to form a V-shaped groove 15 for wiping, together with the clamped inner loop for the purpose of holding the stick if it be so desired.

In Figure 4 which shows a front elevation of my device, the lower edges of the wiping element 13 are shown to be beveled as at 16, thus forming comparatively sharp downwardly and outwardly sloping edges that will attract all the oil dripping or draining down the wiping felt. This feature insures that the accumulation of oil in the felt will be away from the inner wiping edge, and thus there will be less oil to contact the stick as it is drawn through the element, and consequently a cleaner wiping of the stick.

The installation and operation of my wiper is as follows:

The clamp 5 is adjusted and secured around a breather or oil filler pipe 7 or any other similar pipe by means of the bolt 8. When so adjusted the clamp supports the wiper holder 10 with its wiping felt 13 outwardly and to one side of the attaching pipe, the choice of location on or about the engine being determined by requirements of convenience or necessity. If the engine is so constructed that the gauge stick is always retained within the crankcase, my device affords a handy, efficient wiper. If, on the other hand, the engine does not carry the gauge stick integral with it, insertion of the stick in the loop formed by the felt 13 provides a handy carrier as well as a wiper.

It is to be understood that the form of my invention, herewith shown and described, is to be taken as a preferred example of the same, and that various changes in the shape, size and arrangement of parts may be resorted to without departing from the spirit of my invention, or the scope of my subjoined claims.

Having thus fully described my invention, what I claim as new and desire to secure by Letters Patent is:

1. The combination with an attaching device and a pair of outwardly converging jaws rigid therewith, of an absorbent wiper of resilient material folded upon itself to form a retaining loop and compressed between said jaws, with the bight portion of the wiper open and located adjacent the bases of the jaws, and said wiper having at its lower end beveled-outspreading edges adapted to guide and shed oil away from a stick held in the retaining loop.

2. The combination with an attaching device and a pair of outwardly-converging, open jaws rigid therewith, of a U-shaped absorbent wiper of resilient material compressed between said jaws with the bight portion of the wiper open and located adjacent the bases of the jaws, the free ends of said jaws retaining the adjoining walls of the wiper in contact and the free edges of said walls being outspread to provide an auxiliary wiper.

OSCAR G. HALE.